United States Patent [19]

Liang et al.

[11] Patent Number: 5,182,797
[45] Date of Patent: Jan. 26, 1993

[54] MULTI-PROCESSOR GRAPHICS DISPLAY SYSTEM FOR DISPLAYING HIERARCHICAL DATA STRUCTURES

[75] Inventors: Bob C.-C. Liang; Nina Y. Liang, both of West Hurley; Michael J. Phelps, Kingston; David C. Tannenbaum, Kingston, all of N.Y.

[73] Assignee: International Business Machines Corporation, Armonk, N.Y.

[21] Appl. No.: 890,306

[22] Filed: May 27, 1992

Related U.S. Application Data

[63] Continuation of Ser. No. 425,891, Oct. 23, 1989, abandoned.

[51] Int. Cl.[5] .............................................. G06F 3/14
[52] U.S. Cl. ..................... 395/160; 395/161; 395/164
[58] Field of Search ................................ 395/160–166

[56] References Cited

U.S. PATENT DOCUMENTS

| 4,862,392 | 8/1989 | Steiner | 364/522 |
| 4,928,247 | 5/1990 | Doyle et al. | 364/518 |
| 4,967,375 | 10/1990 | Pelham et al. | 364/518 |

OTHER PUBLICATIONS

Foley and Van Dam, *Fundamentals of Interactive Computer Graphics*, Addison–Wesley Publishing Co., 1982, pp. 406–410, 424–428.
Abi-Ezzi et al., "A Special Graphics System for Phigs", *Computers & Graphics*, vol. 12, No. 2, 1988, pp. 157, 160, FIG. 3.
Noll et al., "PHI-GKS: An Implementation to Support GKS-3D and PHIGS", *Computers & Graphics*, vol. 12, No. 2, 1988, pp. 164, FIG. 6.

Primary Examiner—Heather R. Herndon
Attorney, Agent, or Firm—William A. Kinnaman, Jr.; Mark S. Walker

[57] ABSTRACT

A multi-processor graphics system including a general purpose system control processor for setting up the workstation environment and data traversal structures based upon an application model language description. Workload balancing and interprocessor communication is managed by defining a general purpose interface between the general purpose processor and special purpose graphics control processor. The system control processor accepts application program information in a standard form, such as a hierarchical graphics language definition, then converts it into generalized interface control blocks for communication to the graphics control processor. Graphics control processor is signalled by an interrupt from the system control processor to begin the traversal process. The graphics control processor can then access the standard control blocks contained in system memory and perform the traversal necessary to generate the requested graphics image. Generalized control blocks allow rapid adaptation to program changes and efficient communication between the general purpose and specialized processors.

9 Claims, 8 Drawing Sheets

MULTI-PROCESSOR GRAPHICS DISPLAY SYSTEM FOR DISPLAYING HIERARCHICAL DATA STRUCTURES

This application is a continuation of application Ser. No. 07/425,891, filed Oct. 23, 1989, now abandoned.

BACKGROUND OF THE INVENTION

1. Field of the Invention

This invention relates to information hantling systems for processing graphical data and in particular to graphics display systems comprised of multiple processors some of which have specialized graphics processing functions. This invention relates more particularly to graphics display systems for displaying graphics data stored as a hierarchical structure of graphics display elements, and more precisely to the separation of function and the interface between a general purpose processor for accessing graphics data and special purpose graphics processors.

2. Backqround Information

Graphics display systems used in the area of computer aided design (CAD), and computer aided engineering (CAE) display images created based upon graphics orders entered into the system. The graphics orders define objects in terms of primitive drawing operations for line, point, polygon, and similar primitive structures. Complex graphical images can be represented as a combination of these graphical primitives. Modern graphics display systems implement hierarchical representations of data that allow a single low level structure definition or sequence of structure definitions to be repetitively used to express an object. Thus, for example, a primitive definition of a single wheel may be entered, and then used repetitively to define the wheels of an automobile on a computer-aided design application. One of the emerging standards for graphics system programming is known as PHIGS (Programmer's Hierarchical Interactive Graphics System) that provides a set of functions for the definition, display, and manipulation of graphical data and geometrically related objects.

An interface standard such as PHIGS allows a particular graphics application program to be written at a high level without concern for the detailed implementation in a particular graphics display system. The use of this higher level language allows applications programs to be transferred between various types of equipment with only minor modification.

The logical data flow of a system employing hierarchical data structure is presented in FIG. 1. User application program 100 passes the data stream 102 containing necessary graphics information to the graphics processing system. The data stream information is divided into two functional categories: structure storage 104 containing the detailed descriptions of the graphics elements to be displayed; and the workstation state list 106 containing information necessary to set workstation variables to the appropriate value. A workstation program operating on the structure storage and workstation state list produces the final image to be generated on display surface 108.

A hardware architecture for implementing this form of graphics display system is shown in FIG. 2. Communications processor 110 provides an interface to a host system containing graphics orders and potentially, the user application program and graphical database. System control processor 112 manages the geometric database and controls the overall operation of the graphics display system System control processor 112 is a general purpose processor that can perform a variety of tasks. Graphics command processor 114 interprets the graphics commands placed in system memory by the system control processor and generates the detailed commands required by display processor 116, associated geometric processing unit 118 and rendering unit 120 that perform the actual object drawing. The final outputs of the display processor are pixel definition signals sent on line 122 to &:he frame buffer for display on a display device.

The functional structure of a multi-processor computer graphics display system is discussed in J. D. Foley and A. Van Dam *Fundamentals of Interactive Computer Graphics*, Addison-Wesley Publishing Company, 1982 on pp. 406–410 and 424–428. Other implementations of multi-processor graphics systems include U.S. Pat. No. 4,862,392 "Geometry Processor for Graphics Display System" to Steiner.

The model presented by Foley and Van Dam shows a display file compiler as part of the application program that contains a model traverser to map the application model (AM) to the structure display file containing a hierarchical description of the graphical representation of the object. The hierarchical display file is then processed by the display processing unit to create graphical primitive orders (linear display file) necessary to generate the object in the display controller. The display file compiler (DFC) according to Foley and Van Dam is specialized as part of the application package. This leads to certain inefficiencies due to the need to create a separate display file compiler for each application or each graphics display system. The introduction of standardized interface formats such as PHIGS (Programmers Hierarchical Interactive Graphics System) allows the introduction of standardized display file compilers which convert an application model created in, for example, the PHIGS structure to the structure display file format. This display file translation typically requires significant processor resources and tends to become a bottleneck in the graphics display systems Steiner illustrates a multiprocessor system with a specified processor for geometry processing. Steiner illustrates the advantages of the multi-processor system but does not address the problem of the display file compiler bottleneck conversion of the application model to structured display file format.

The display file compiler has two primary functions First, the DFC must establish the physical graphics display system environment ordered by the application graphics instructions. This typically involves establishing workstation parameters and creating workstation default profiles. The second function involves processing or traversing of the graphics orders to generate the detailed description of the object necessary for geometry processing and rendering by subsequent processors. This traversal occurs within the defined workstation environment and is dependent upon the established environment. The inter-relationship of the workstation environment and model traversal has dictated that these be accomplished in the same logical processor. However, processor speed limitation has caused the single display file compiler logical processor to become a bottleneck in graphics display systems.

SUMMARY OF THE INVENTION

It is therefore an object of the present invention to define a graphics system architecture that divides the display file compilation function into separate logical processors. One, general purpose system control processor for establishing environment in response to an application model and for controlling the model traversal and display generation processes, and a second special purpose processor for performing model traversal to generate a structure display file for further geometric processing and rendering.

It is a further object of the invention to define a method for balancing the workload between the general purpose and special purpose graphics processors.

It is yet another object of the present invention to define a general purpose interface between the general purpose system control processor and the specialized graphics processor.

It is yet another object of the invention to provide a general interface structure which is efficient to update from the general purpose computer processor as well as efficient to process from the specialized graphics processor viewpoint.

DETAILED DESCRIPTION OF THE INVENTION

Figure 1:
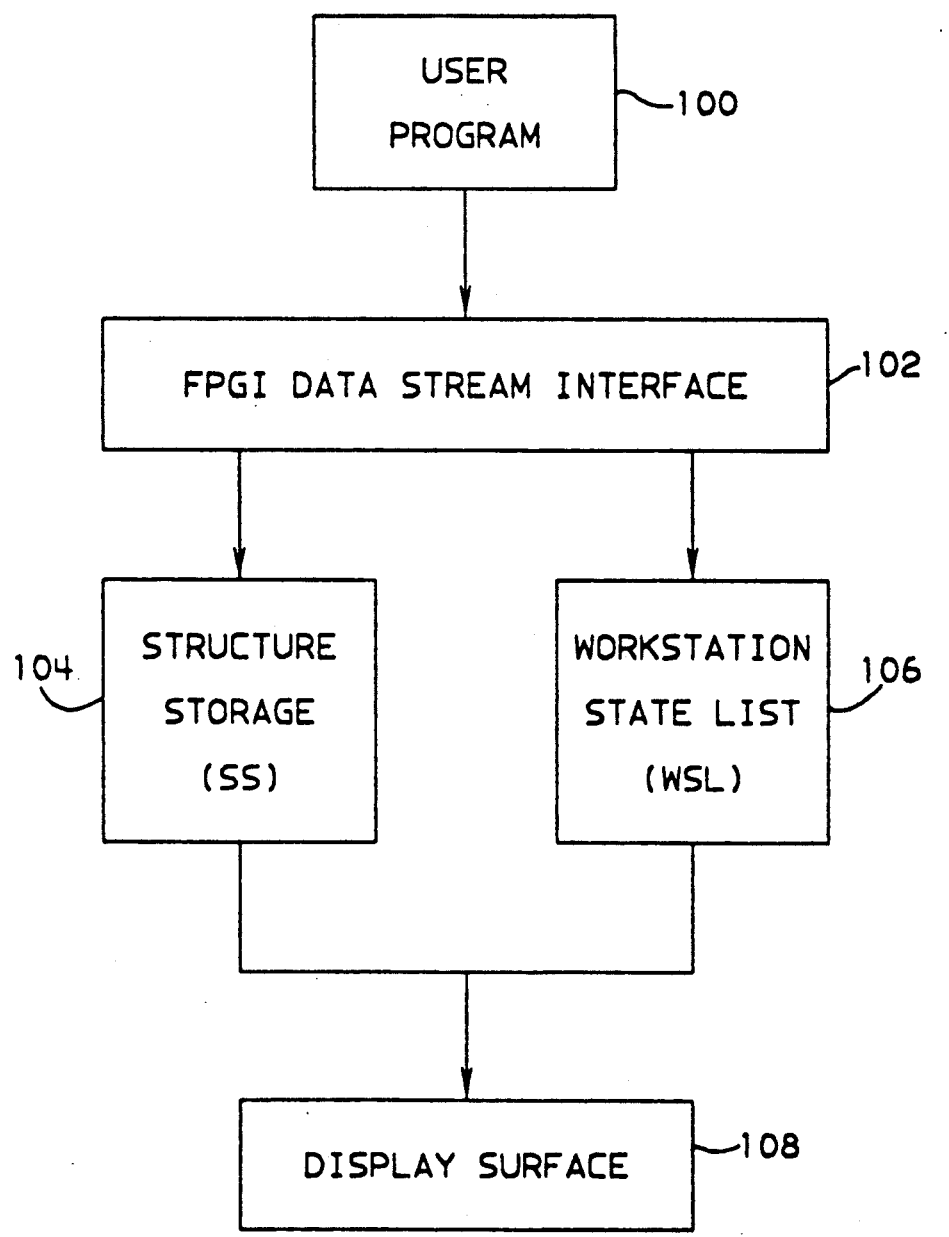
FIG. 1 is a data flow diagram illustrating the types of data processed by a multi-processor graphics system according to the present invention.
Figure 2:
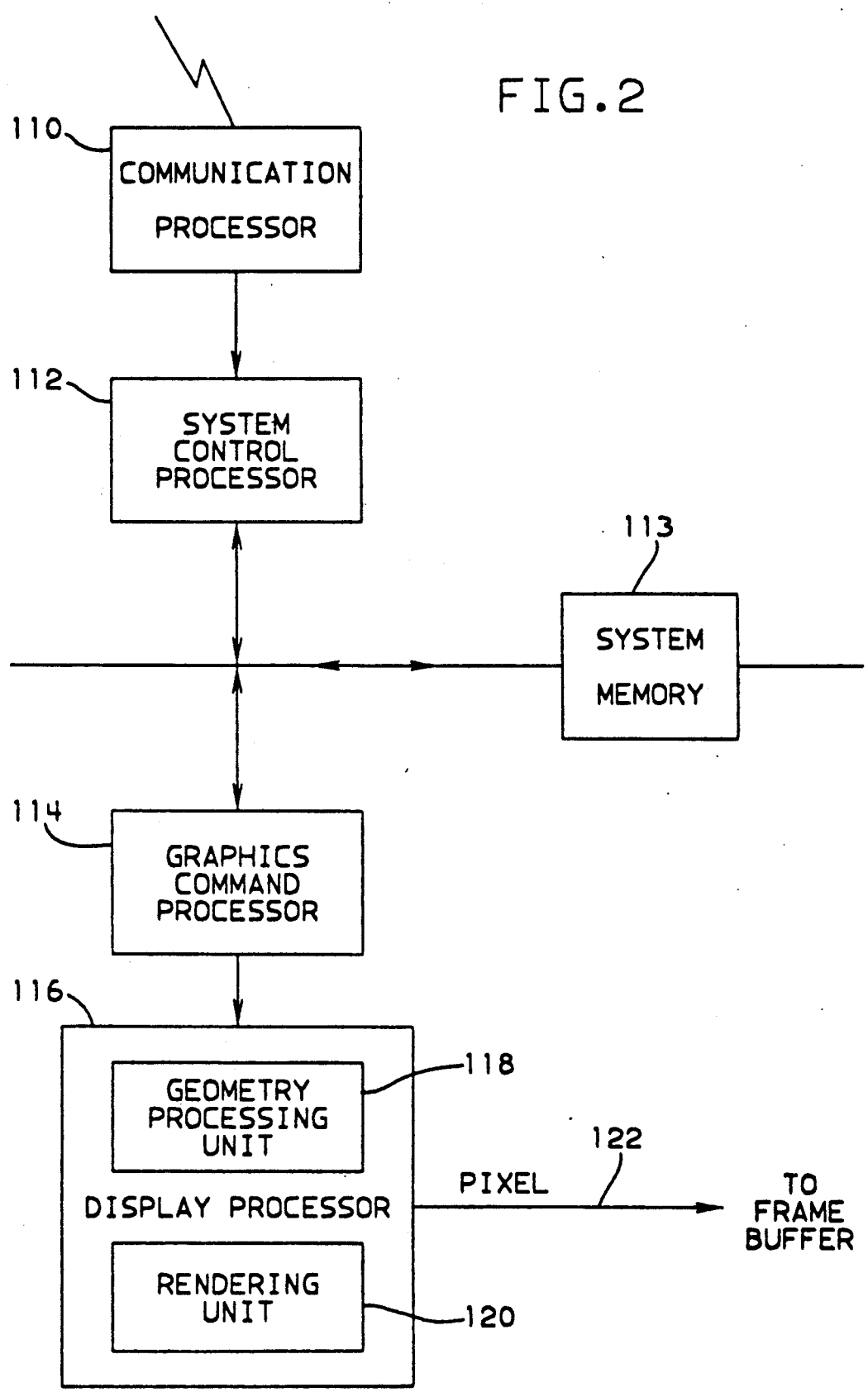
FIG. 2 is a block diagram of the processing elements of the graphics display system according to the present invention.

FIG. 2 presents a multi-processor display system according to the present invention. A communications processor 110 communicates with the host computer through a channel connection or network:. The communications processor receives outbound data from a user program in the host and sends the data to system control processor 112 for processing. The data transmitted is typically an application model using a standard interface description such as PHIGS. Any inbound data generated in the workstation will be sent to the host computer through the communications processor.

System control processor (SCP) 112 controls the data flow of the system. The system control processor analyzes the application model data to generate a workstation state list describing the required processing environment and structure storage containing the hierarchical model description in the system memory. The SCP controls the graphics control processor execution to draw the geometric images from structure storage based upon user program commands System memory 113 stores the workstation sta&:e list and structure storage created by the system control processor 12. System memory 113 is also accessible by the graphics command processor and is used during the graphics drawing process.

Graphics command processor (GCP) 114 traverses the graphics model stored in system memory 113 and processes instructions to generate and pass geometric processing orders to the display processor for geometric processing and primitive rendering. Display processor 116 consists of two components: geometry processing unit 118 which performs transformation, clipping and mapping of geometric primitives, including light model calculation for shading, and rendering unit 120 that renders primitives including line drawing, polygon filling and shading and hidden line and hidden surface removal. The output of the display processor is a series of pixels that are passed to the frame buffer for eventual display on the display device.

The primary function of the system control processor 12 is to process the application model data stream transmitted from the host computer through coxmunication processor 110. The system control processor 112 forms the data into specified control blocks which are used to communicate with the graphics control processor 114. SCP processing is designed to reduce GCP workload by splitting workstation environment determination (performed by the SCP) from model traversal (performed by the GCP). The control blocks are built by the system control processor and stored in the system memory 113. The control blocks include:

Workstation State List (WSL)—system control processor to graphics control processor communication block
  Structure Storage (SS)
  traversal control block
  view tables
  view addressing table
  root blocks
  edit blocks The workstation state list contains data descriptions and drawing information required by the workstation to process the application model This table is initialized at system startup and may be modified by certain procedural orders. Drawing control tables contain the information required by the graphics control processor for model traversal and picture drawing. The workstation s&.ate list contains the graphics interface output flags, view table settings, bundle table settings, other table settings, filter tables, pointers to the various work areas, and character set identifications. Current control tables contain the pointers to default line style and marker type and hatch areas, input device locators, miscellaneous fields, pointers to current traversal block, and content of the request traversal block.

The traversal control block contains a list of view masks. These masks are used to k-op track of the different changes made to each view. The offset of a bit into the mask correlates to the index of the view. The offset is measured starting from the leftmost bit of the mask field, thus, the view 0 is at offset 0 of the mask which correlates to the left most bit. At graphics interface initialization all views are inactive except view 0. Each view becomes active when a "set view characteristic" order for that view is processed by the system control processor. Each time the graphics control processor 114 has completed traversing a view, it sets the corresponding table entry to 1. When the graphics control processor finishes the traversal of all active views it interrupts the system control processor 112 which then replaces all table entries with 0. This communication table between the graphics control processor and system control processor allows the graphics control processor to avoid redrawing already completed low priority views when temporarily interrupted by the system control processor.

Figure 3:
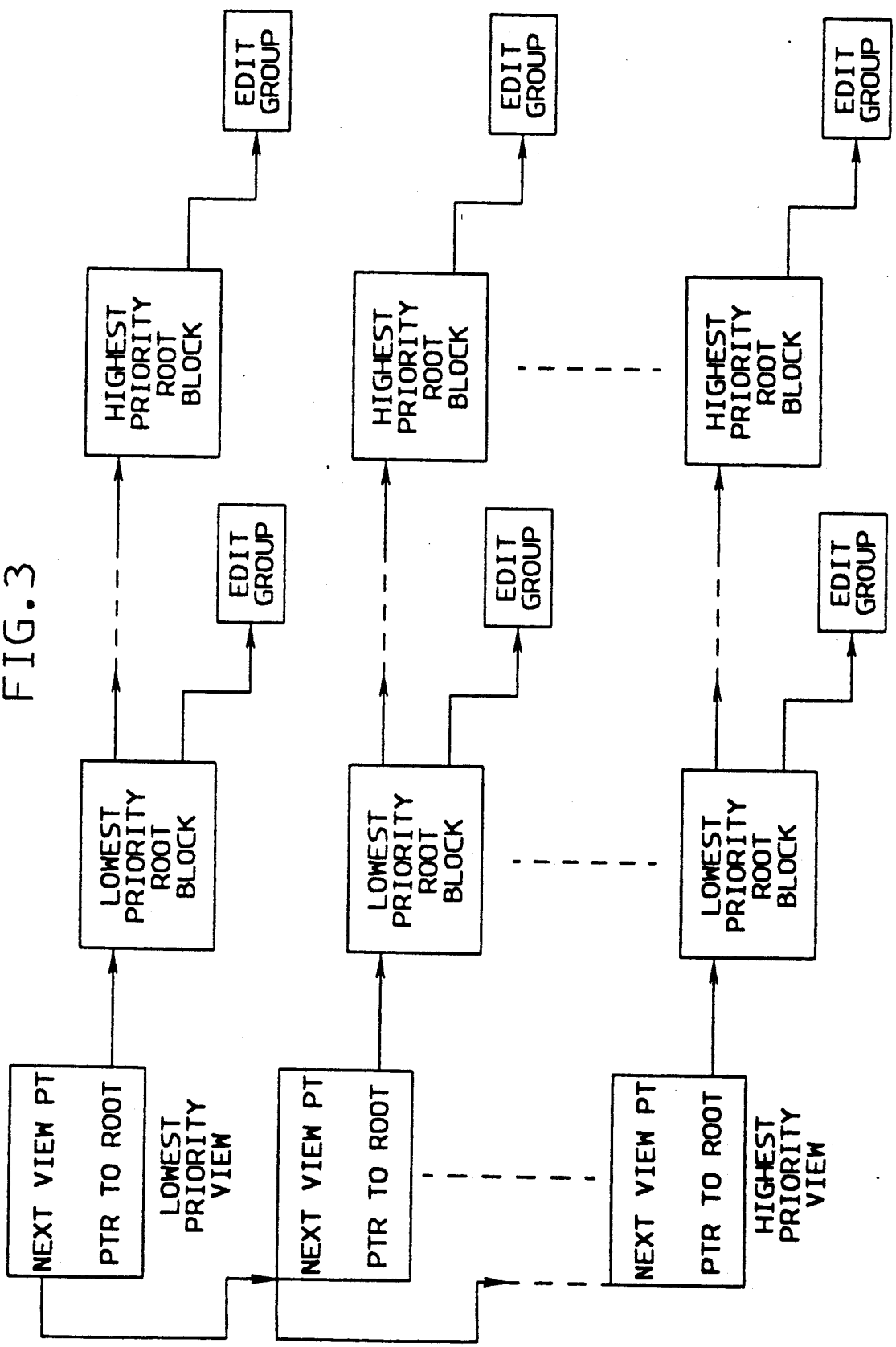
FIG. 3 is an illustration of the linking between the elements of the graphics structure.

The view table contains the characteristic information of an individual view. All view tables are chained to each other according to priorities. When a view is first created, its content is set to a default content of the view 0. Contents of all view tables, except for view 0, may be later modified by procedural orders. An example of the chaining of views to structure blocks and groups is shown in FIG. 3.

The view addressing table contains pointers to the requested view table addresses, the current view table addresses, and the output view priority table. These tables, among other things, specify the requested views and the currently active views. The current input view priority table, request input view priority table, and current input view priority table are all similar to the output view priority table and indicate the order of view processing during respective operations.

For each root connected to a view there exists a corresponding root block All roots connected to a particular view are connected according to their priorities in the view. The lowest priority root is always connected first proceeding to the higher priority views.

The edit block list is made up of one or more variably sized edit blocks Each edit block contains portions of the attribute or primitive strr:cture element for a graphic display. The structure elements in the edit block are arranged in order according to the appearance in the structure. Blocks are connected to each other through doubly linked pointers.

Structure elements are the smallest units in the display data structure. A structure element could be an output primitive such as a polyline, or an attribute such as color, associated with the output primitive. A partial list of structures in a standard interface such as PHIGS includes:
1. bundled attributes selection elements
2. individual attribute selection elements
3. insert application data
4. execute structure
5. insert label
6. set pick identifier
7. set attribute source flag
8. modelling transformation elements
9. output primitive elements The general purpose interface according to the preferred embodiment of the present invention supports a total of five bundle tables each having a maximum of 20 entries. The user application may direct certain tables to be established at interface initialization. The general interface then allocates consecutive storage locations for specified bundle tables. Each bundle entry corresponds to one bundle index and entries are arranged in consecutive order. The following types of bundle tables are supported:
polyline bundle table
polymarker bundle table
text bundle table
interior bundle table
edge bundle table
pattern bundle table
hatch bundle table.
Additional tables include:
the hatch table;
the depth queue table;
the cull size table;
the color processing mole table;
the light source table;
the active character set table;
the line type table;
the marker type table;
the hardware color table;
logic color table;
class name table; and
filter bit table.

The class name table and filter bit table together contain the filter table information for highlighting, picking and invisibility filters Both tables contain 1,024 entries in the preferred embodiment. When a class name is requested to be added to the pick inclusion filter, the GCP will insert the class name into the proper entry in the class name table and sort the class name table. The GCP then activates the pick inclusion bit in the corresponding index and entry into the filter bit table. If the class name is requested to be added to both the pick inclusion filter and highlighting exclusion filter, the general interface first inserts the specified class name into the proper entry in the class name table and then activates the corresponding bits for pick inclusion and highlight exclusion.

The workstation viewport is a portion of the display surface where the output images will be shown. The workstation window is a square or rectangular parallelepiped of which the boundary and interior will be mapped into the workstation viewport while preserving the aspect ratio in X and Y but not necessarily in Z. The general interface uses this information together with the viewport, as set by the application, to calculate the device viewport and store the resulting information in the view table. The workstation window viewport is stored in the workstation state list for the inquiry function.

The system control processor 112 and the graphics control processor 114 communicate through interrupts and the communication areas described, above which are stored in the system memory 113. The system control processor will first initialize graphics control processor 114 through general interface initialization. This initialization includes establishment of all interface control blocks. The SCP may next interrupt the graphic control processor to start traversal and may later stop traversal.

The graphics control processor may interrupt the system control processor to signal that initialization is complete, traversal is complete, a stop traversal request is complete, or an error has occurred.

Figure 4:
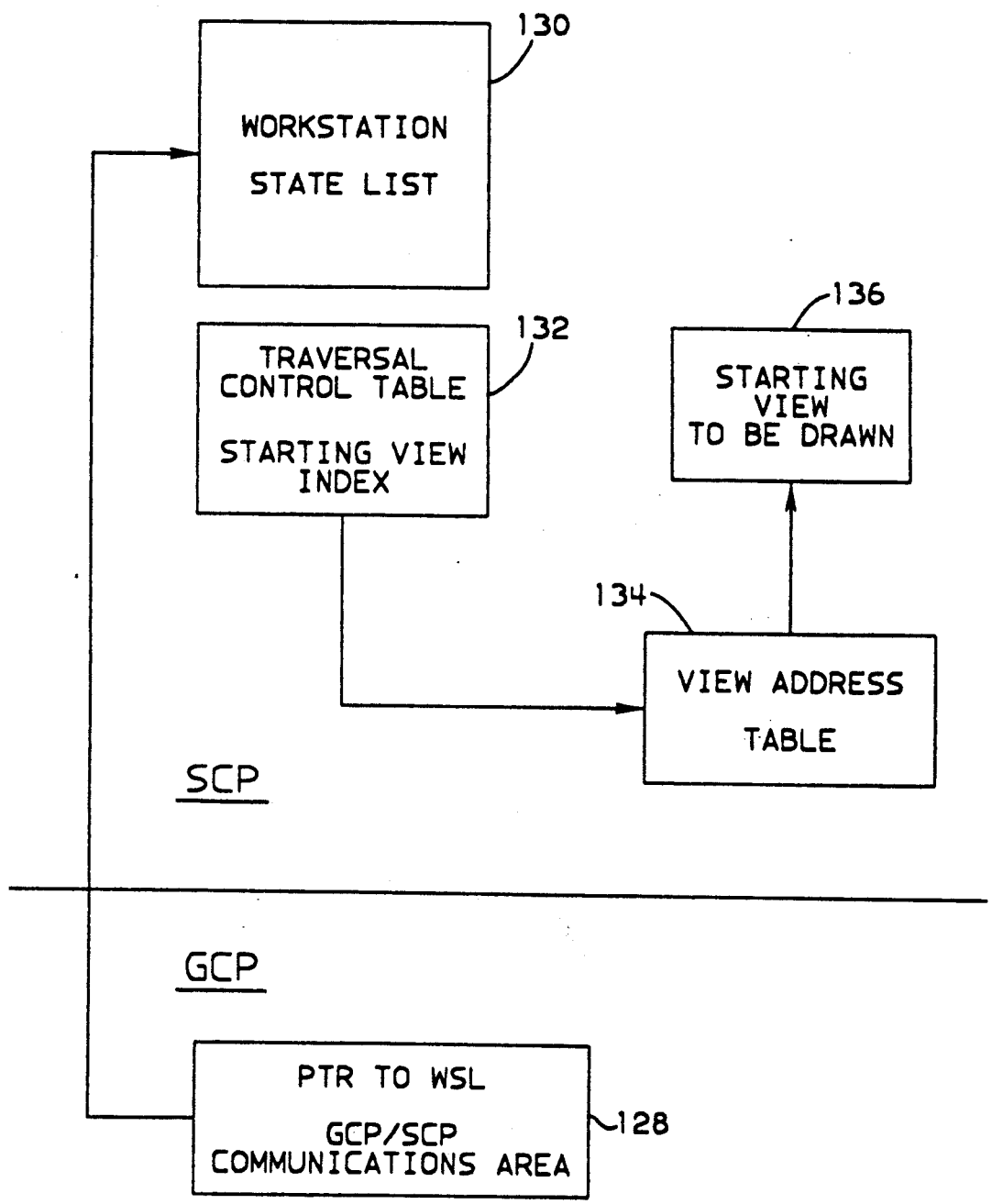
FIG. 4 is an illustration of the memory organization and linkage employed in the general purpose interface.

The actions which occur on each of these interrupts will now be described. FIG. 4 is used to describe the process. Graphics control processor initialization begins when the system control processor interrupts the graphics control processor. When the reason code passed by the interrupt is "initialization" graphics control processor 114 reads data from the workstation state list 130 in order to initialize the graphics control processor. The GCP maintains a pointer 128 to the shared area of system memory used for communication with the SCP.

Figure 5:
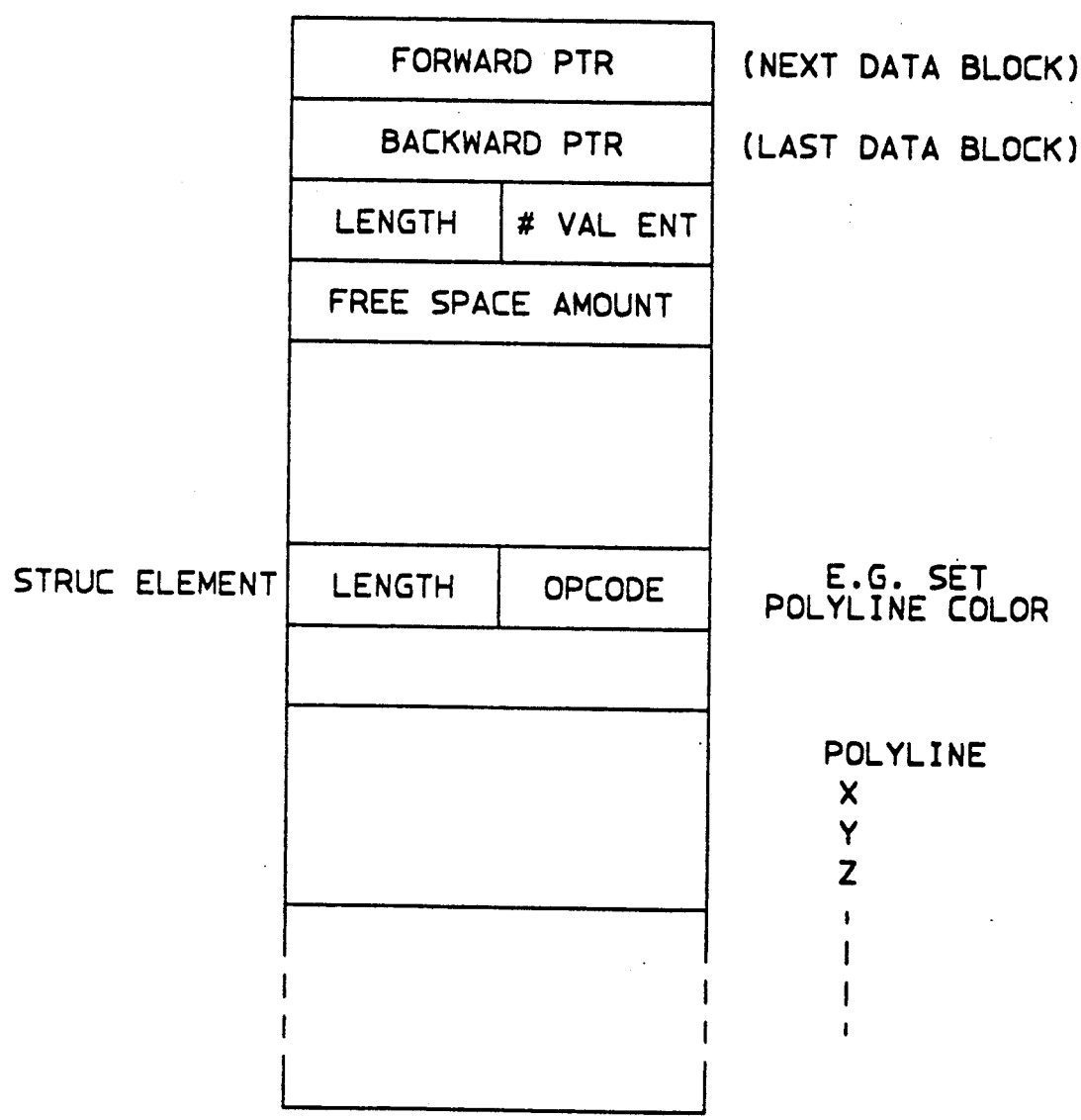
FIG. 5 is an example of the layout of an edit group format.

Graphics control processor traversal is initiated by an SCP interrupt. If the interrupt reason code is "draw geometric data" then the traversal process begins The graphics control processor begins by fetching the first word in the traversal control table 132 and checks each resource The GCP next fetches the index of the view to be drawn first in the traversal control table. The GCP finds the pointer to the starting view in the view addressing table 134 and begins processing the data fetched from the view table 136. Processing of the view table continues by accessing the pointers to the first root block in the view table and continues by processing the root structure to access the first addressed edit group. The structure of an edit group is shown in FIG. 5.

Figure 6:
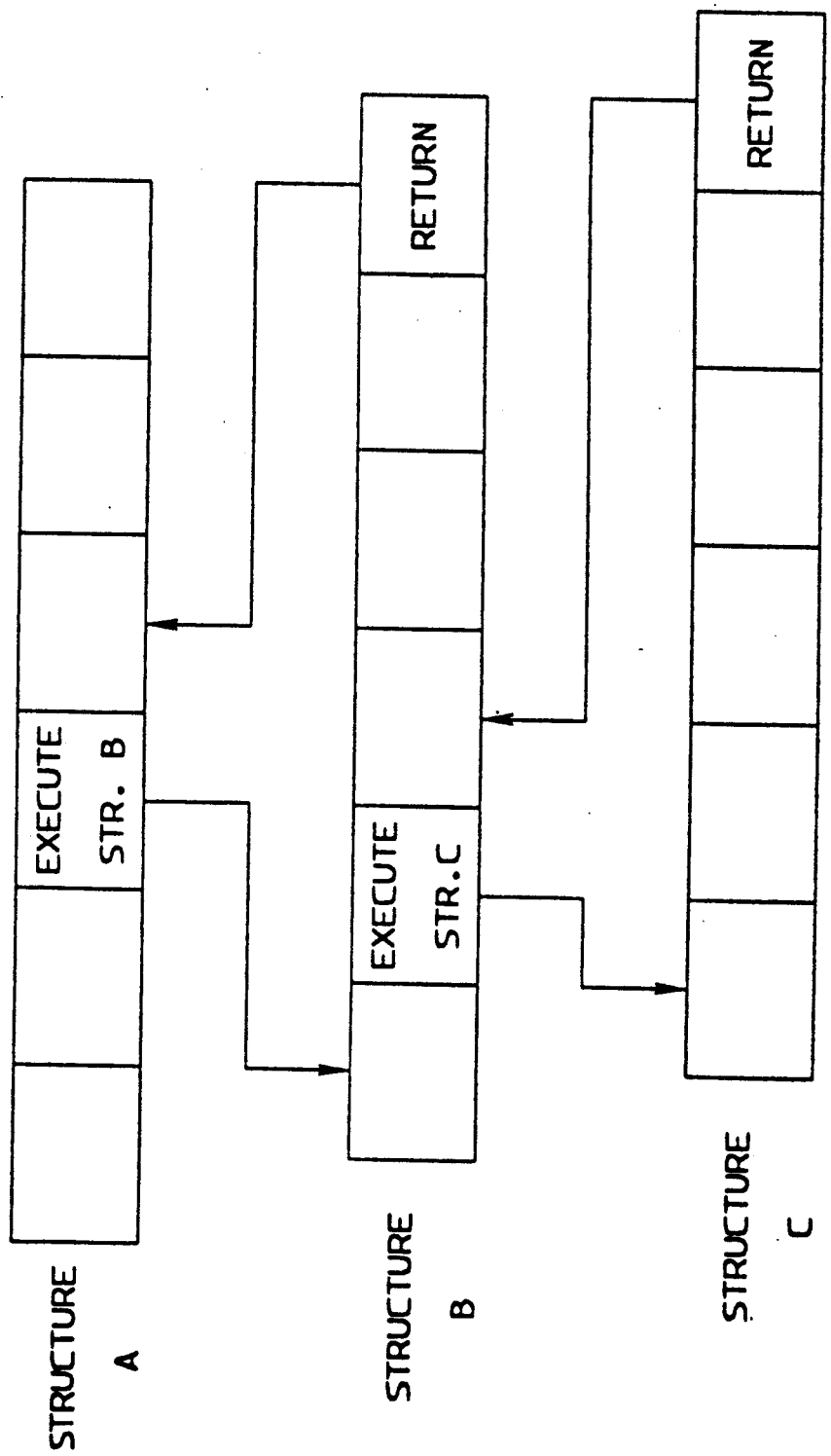
FIG. 6 is an illustration of the flow of control between graphics structures
Figure 7:
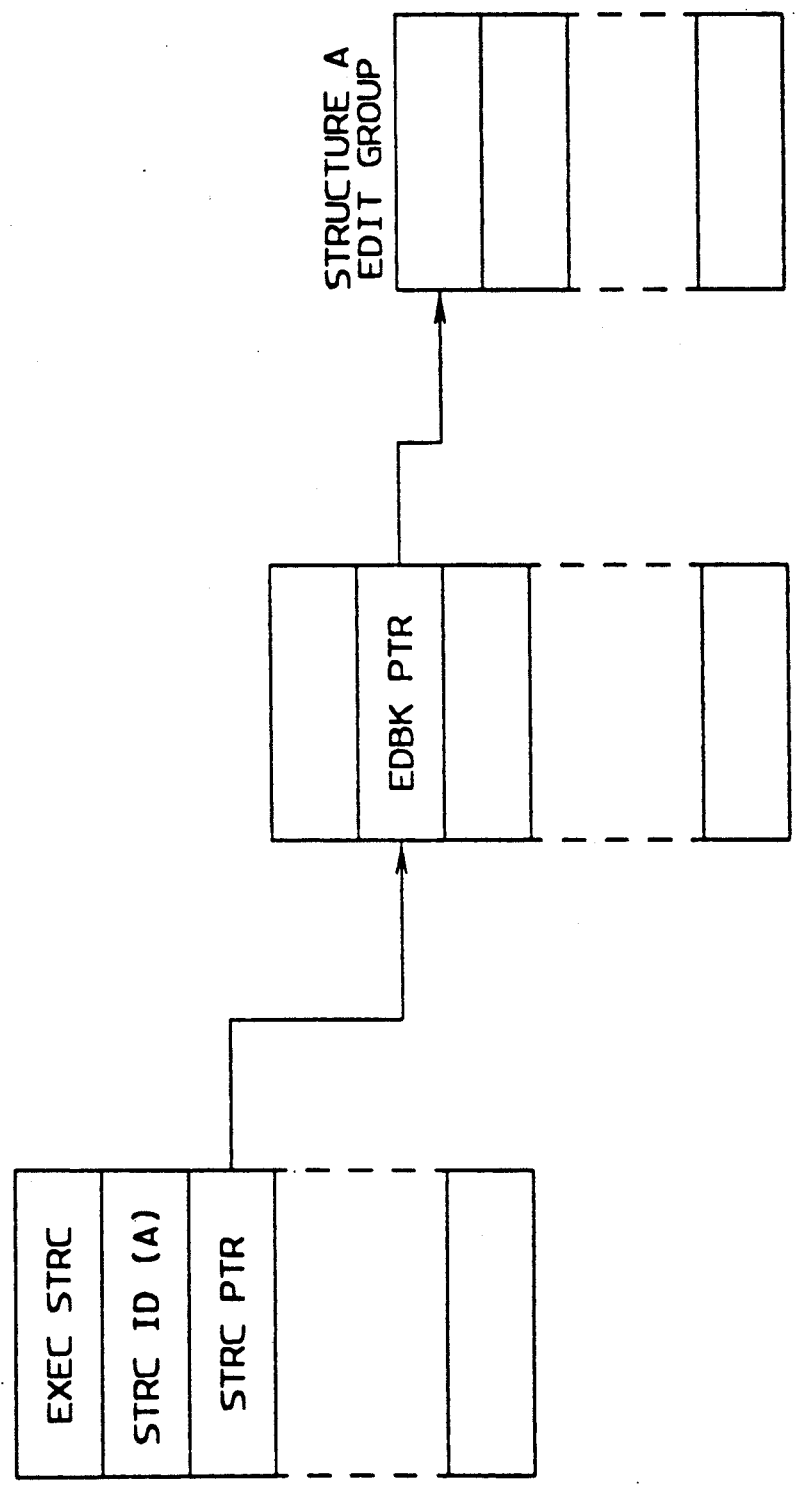
FIG. 7 is an illustration of the memory organization and inter-relationships of structure groups

If an "execute structure" is encountered in the edit group, the graphics control processor will use the pointer to an entry in the "execute structure" first edit group address table and will locate a pointer to the first edit group associated with that structure (FIGS. 6 and 7).

Figure 8:
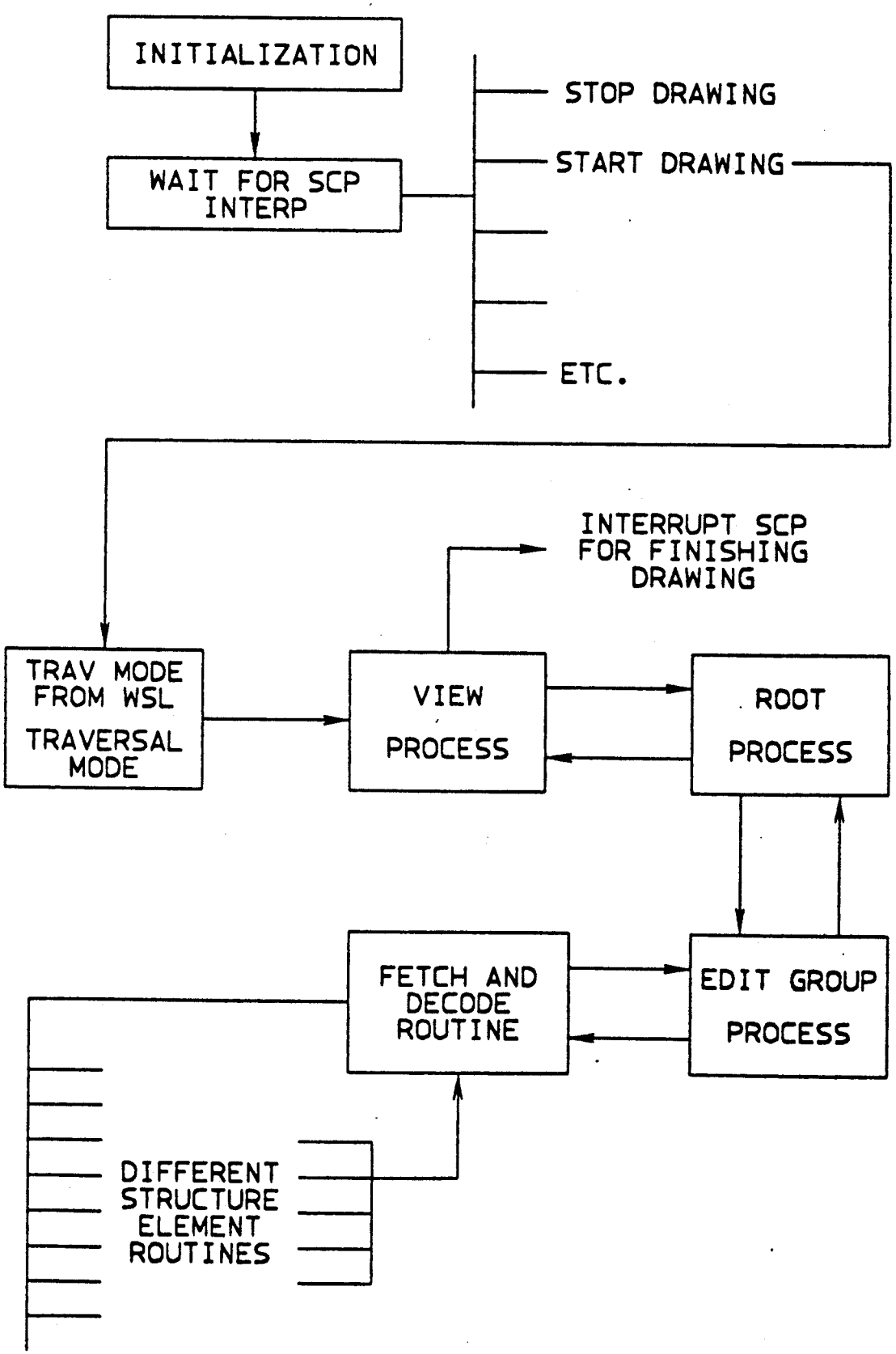
FIG. 8 is a flowchart illustrating the flow of control in a traversal operation in the graphics control processor according to the present invention.

The graphics control processor will continue to operate in this manner until it reaches the end of a root structure when it will test to determine whether additional root blocks exist. At the completion of all root block traversals, the graphics control processor tests for additional views. When the last view has been completely traversed, the graphics control processor causes the frame buffers to be swapped. In a system with a double frame buffer, under certain conditions the grpahics control processor copies the display contents of the first frame buffer to the background frame buffer. Graphics control processor then interrupts the system control processor to signal the finishing of the drawing of one frame using the interrupt. FIG. 8 illustrates the overall flow of the graphics control processor.

The above description has specified a division of processing workload between a system control processor and graphics command processor coordinated through a set of specified control blocks. It will be recognized by those practicing in the grpahics display system area the concept of the general purpose control processor communicating with special purpose processors can be extended beyond the single graphics command processor interface. All extensions of this sort are believed to be extensions of the concepts disclosed herein.

We claim:

1. A multiprocessor system for displaying graphical data, comprising:

first processor means for generating a first data structure containing graphical data for display, said graphical data comprising a plurality of views, and a second data structure containing parameters for controlling the processing of the data contained in said first data structure, said second data structure including a control block indiating for each view whether said view requires traversal; and second processor means for traversing the grpahical data contained in said first data structure ni accordance with the parameters contained in said second data structure to generate an image for display, said second processor means testing said control block before traversing a view and traversing the view only if said control block indicates that the view requires traversal.

2. Apparatus as in claim 1 in which said second processor means tests said control block to determine whether to begin traversing a view and accesses a subsequent view if traversing for said view has been completed.

3. Apparatus as in claim 1 in which said second processor means modifies said control block as traversal of each view is completed to indicate completed traversal.

4. Apparatus as in claim 1 in which said second processor means modifies said control block after all views have been completed to reset an indicator to indicate traversal is required.

5. Apparatus as in claim 1 in which said first processor means interrupts the traversal of said grpahical data by said second processor means to modify one of said views, said second processor means testing said control block upon resumption of traversal to determine whether a view has been modified and retraversing a view only if it has been modified.

6. Apparatus as in claim 1 in which said graphical data contains geometric data, said apparatus further comprising:

third processor means for converting said geometric data to a displayable image, said second processor means on traversal of said graphical data passing said geometric data to said third processor means.

7. Apparatus as in claim 1 in which said first processor means sends a request for the traversal of said first data structure to said second processor means.

8. Apparatus as in claim 1 in which said second processor means signals the completion of said traversal to said first processor means.

9. Apparatus as in claim 1 in which said first data structure is a heirarchical data structure.

* * * * *